United States Patent
Roberts et al.

(10) Patent No.: US 12,481,939 B2
(45) Date of Patent: Nov. 25, 2025

(54) SYSTEM AND METHOD FOR RESOURCE FULFILMENT PREDICTION

(71) Applicant: Tata Consultancy Services Limited, Mumbai (IN)

(72) Inventors: Gerald Kenneth Roberts, Amsterdam (NL); Sheeba Kizhakkyil, Noida (IN); Damaraju Pavankumar, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1073 days.

(21) Appl. No.: 17/504,974

(22) Filed: Oct. 19, 2021

(65) Prior Publication Data

US 2022/0269902 A1   Aug. 25, 2022

(30) Foreign Application Priority Data

Feb. 24, 2021   (IN) ............................. 202121007812

(51) Int. Cl.
*G06Q 10/0631* (2023.01)
*G06F 18/211* (2023.01)
*G06N 3/04* (2023.01)

(52) U.S. Cl.
CPC ...... *G06Q 10/06311* (2013.01); *G06F 18/211* (2023.01); *G06N 3/04* (2013.01)

(58) Field of Classification Search
None
See application file for complete search history.

(56) References Cited

U.S. PATENT DOCUMENTS

| | | | |
|---|---|---|---|
| 2007/0276713 | A1 | 11/2007 | Lee et al. |
| 2015/0248644 | A1 | 9/2015 | Zenger et al. |
| 2020/0051193 | A1* | 2/2020 | Miao ............... G06N 5/022 |
| 2020/0210939 | A1* | 7/2020 | Kolodner ......... G06Q 10/06315 |

(Continued)

OTHER PUBLICATIONS

Hall et al., "Correlation-based Feature Selection for Machine Learning", Proceedings of the Twelfth International Florida Artificial Intelligence Research Society Conference, pp. 235-239, https://dl.acm.org/doi/10.5555/646812.707499, May 1, 1999 (Year: 1999).*

(Continued)

*Primary Examiner* — Mariela Reyes
(74) *Attorney, Agent, or Firm* — Finnegan, Henderson, Farabow, Garrett & Dunner, LLP (57) ABSTRACT

This disclosure relates generally to resource fulfilment prediction and more particularly to training a multi-layer neural network model for resource fulfilment prediction. The conventional resource fulfilment prediction systems typically rely on availability of the requisite skills in the resource requirement request. However, the disclosed system primarily utilizes the time-based features during the modeling process to predict the resource fulfilment accurately. In an embodiment, the system extracts features from a training data including historical resource fulfilment data. The system performs correlation analysis on the extracted features to identify relevant features. The system further derives features using the identified relevant features and uses the derived features in conjunction with the relevant features to train the neural network for resource fulfilment prediction.

9 Claims, 8 Drawing Sheets

(56) References Cited

U.S. PATENT DOCUMENTS

2021/0073661 A1* 3/2021 Matlick ............... H04L 61/3025
2021/0304097 A1* 9/2021 Rehn .................. G06Q 10/1097

OTHER PUBLICATIONS

Yu et al., "Feature Selection for high-dimensional data: a fast correlation-based filter solution", ICML'03: Proceedings of the Twentieth International Conference on International Conference on Machine Learning, pp. 856-863, https://dl.acm.org/doi/10.5555/3041838.3041946, Aug. 21, 2003 (Year: 2003).*

Husband S. Survival Random Forest to Predict Time to Fill. 2017 IEEE International Conference on Data Mining Workshops (ICDMW) [online], Nov. 2017 [retrieved on Feb. 24, 2025]. Retrieved from internet <https://ieeexplore.ieee.org/document/8215663> (Year: 2017).*

Guenole et al., "The Business Case for AI in HR," IBM (2018).

* cited by examiner

SYSTEM AND METHOD FOR RESOURCE FULFILMENT PREDICTION

PRIORITY CLAIM

This U.S. patent application claims priority under 35 U.S.C. § 119 to: India Application No. 202121007812, filed on Feb. 24, 2021. The entire contents of the aforementioned application are incorporated herein by reference.

TECHNICAL FIELD

The disclosure herein generally relates to the field of neural network-based prediction, and, more particularly, to system and method for resource fulfilment prediction using multi-layer neural network.

BACKGROUND

Typically, mass recruitments in organizations are executed by a specialist recruitment firm or a professional service firms which must deploy resources to projects at a highly rapid pace and volume. In such mass recruitments, a clear understanding of the organization's ability to deploy consistently, on time, and to focus only on those job requirements which have a high chance of success in closure of position requirement requests is essential.

For recruitment firms, a more efficient use of their teams to fulfill resource requirements has a direct impact on their top line figures, simply put, the more positions they fulfill the more they earn. Herein, resource requirement refers to the vacant positions in a firm or organization which have to be filled by the recruiter. Moreover, given the prevailing level of competition, the ability to manage key metrics, and to set appropriate expectations with the customers drives both revenue and customer satisfaction for an organization. Professional service firms have a similar situation. The demand for resources comes from clients for projects and the demand needs to be quickly fulfilled. The firm's ability to identify the time duration by when a resource may be available, allows organizations to set the necessary expectations with their customers and thereby manage expectations. In all situations, job requests which are either auto-closed or cancelled/are time wasted by the respective Resource Management (RM) teams. The ability to predict the chance of full closure enables the RM teams to prioritize the activities thereby increasing focus on timely deployment and fulfillment of resources.

There are various existing solutions that use a variety of techniques to scan resumes and job descriptions and provide ranking and recommendations as to the suitability of the match based on the contents of the resume and the request requirement needs. However, the current available solutions do not provide any indication of likelihood of identification of right candidate within the required time frames. Furthermore, the current solutions do not give any insight on the approximate time taken to fulfil the request or whether the final status of the requirement is cancelled (for whatever reason) or fulfilled.

SUMMARY

Embodiments of the present disclosure present technological improvements as solutions to one or more of the above-mentioned technical problems recognized by the inventors in conventional systems. For example, in one embodiment, a method for resource fulfilment prediction using multi-layer neural network is provided. The method includes obtaining, via one or more hardware processors, an input data comprising a plurality of digital resource fulfilment requests and outcome of the plurality of digital resource fulfilment requests prestored in one of more repositories. Further the method includes extracting, via the one or more hardware processors, a first set of features by applying heuristics to the input data. Furthermore, the method includes determining, via the one or more hardware processors, a correlation matrix indicative of correlation between feature pairs selected from amongst the first set of features. Also, the method includes removing, based on the correlation matrix, redundant features from the first set of features to obtain a set of non-correlated features via the one or more hardware processors. Moreover, the method includes deriving, by using the set of non-correlated set of features, a set of time-based features associated with the input data, via the one or more hardware processors, wherein the set of time-based features comprises one or more of a request start date, a request end date, a request creation date and a request closing date associated with the plurality of digital resource fulfilment requests. The method includes training, via the one or more hardware processors, the neural network for prediction of resource fulfillment by using the set of time-based features and the set of non-correlated features.

In another aspect, a system for resource fulfilment prediction using mufti-layer neural network is provided. The system includes a memory storing instructions; one or more communication interfaces; and one or more hardware processors coupled to the memory via the one or more communication interfaces, wherein the one or more hardware processors are configured by the instructions to obtain an input data comprising a plurality of digital resource fulfilment requests and outcome of the plurality of digital resource fulfilment requests prestored in one of more repositories. Further, the one or more hardware processors are configured by the instructions to extract a first set of features from the input data by applying heuristics to the input data. Furthermore, the one or more hardware processors are configured by the instructions to determine a correlation matrix indicative of correlation between feature pairs selected from amongst the first set of features. Moreover the one or more hardware processors are configured by the instructions to remove, based on the correlation matrix, redundant features from the first set of features to obtain a set of non-correlated features. Also, the one or more hardware processors are configured by the instructions to derive, by using the set of non-correlated set of features, a set of time-based features associated with the input data, wherein the set of time-based features comprises one or more of a request start date, a request end date, a request creation date and a request closing date associated with the plurality of digital resource fulfilment requests. Further, the one or more hardware processors are configured by the instructions to train the neural network for prediction of resource fulfillment by using the set of time-based features and the set of non-correlated features.

In yet another aspect, a non-transitory computer readable medium for a method for resource fulfilment prediction using multi-layer neural network is provided. The method includes obtaining, via one or more hardware processors, an input data comprising a plurality of digital resource fulfilment requests and outcome of the plurality of digital resource fulfilment requests prestored in one of more repositories. Further the method includes extracting, via the one or more hardware processors, a first set of features by applying heuristics to the input data. Furthermore, the method includes determining, via the one or more hardware processors, a correlation matrix indicative of correlation between feature pairs selected from amongst the first set of features. Also, the method includes removing, based on the correlation matrix, redundant features from the first set of features to obtain a set of non-correlated features via the one or more hardware processors. Moreover, the method includes deriving, by using the set of non-correlated set of features, a set of time-based features associated with the input data, via the one or more hardware processors, wherein the set of time-based features comprises one or more of a request start date, a request end date, a request creation date and a request closing date associated with the plurality of digital resource fulfilment requests. The method includes training, via the one or more hardware processors, the neural network for prediction of resource fulfillment by using the set of time-based features and the set of non-correlated features.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Typical recruitment facilitating systems use a variety of text analysis techniques ranging from pattern matching to natural language processing (NLP) techniques to scan resumes, analyze them for certain key words and match against a job description. Conventional systems rely primarily on matching skills between the job requirement and candidates' resumes. And thus, such systems are able to identify or shortlist only those resumes which best matches the job description irrespective of any other criteria. It has been observed that when such shortlisted resumes are considered for further processing do not lead to a closure of positions in time, thereby leading to missing the timelines meant for filling the positions. Moreover, such systems do not give any insight on the approximate time taken to fulfil the request or whether the final status of the requirement is cancelled (for whatever reason) or fulfilled.

Various embodiments disclosed herein provides method and system for accurate prediction of fulfilment of requirement requests with a predefined timeframe. For example, the embodiments disclose a multi-layer neural network model for resource fulfilment prediction that is capable of identifying features relevant for resource fulfilment prediction. Additionally, the system is capable of deriving another set of features from the identified features that are relevant for resource fulfilment prediction. The system utilizes the identified and derived features for training the neural network model for resource fulfilment prediction. In accordance with various embodiments of the present disclosure, the identified and derived features are time-based features. It has been observed that by using only time-based features for training the neural network, the disclosed neural network is able to make predictions which are nearly 95 percent accurate. The details of the disclosed method, system and experimental evaluation of the disclosed neural network are provided in the description below.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 6C, where similar reference characters denote corresponding features consistently throughout the figures, there are shown preferred embodiments and these embodiments are described in the context of the following exemplary system and/or method.

Figure 1:
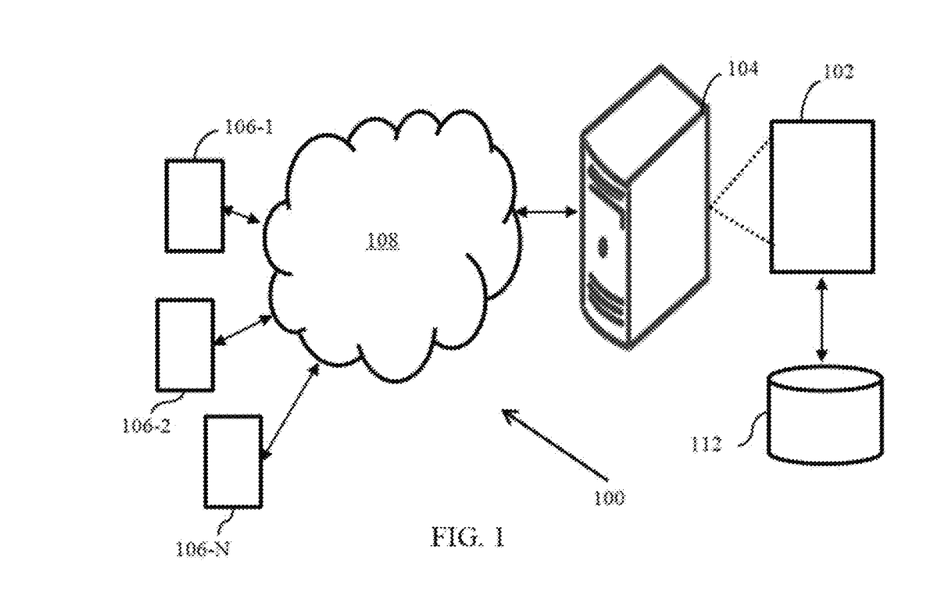
FIG. 1 illustrates an exemplary network implementation of resource fulfilment prediction according to some embodiments of the present disclosure.

FIG. 1 illustrates an example network implementation 100 of a system 102 for resource fulfilment prediction, in accordance with an example embodiment. The disclosed system is capable of predicting resource fulfilment in response to a resource fulfilment request in a predefined timeframe.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2-3.

Figure 2:
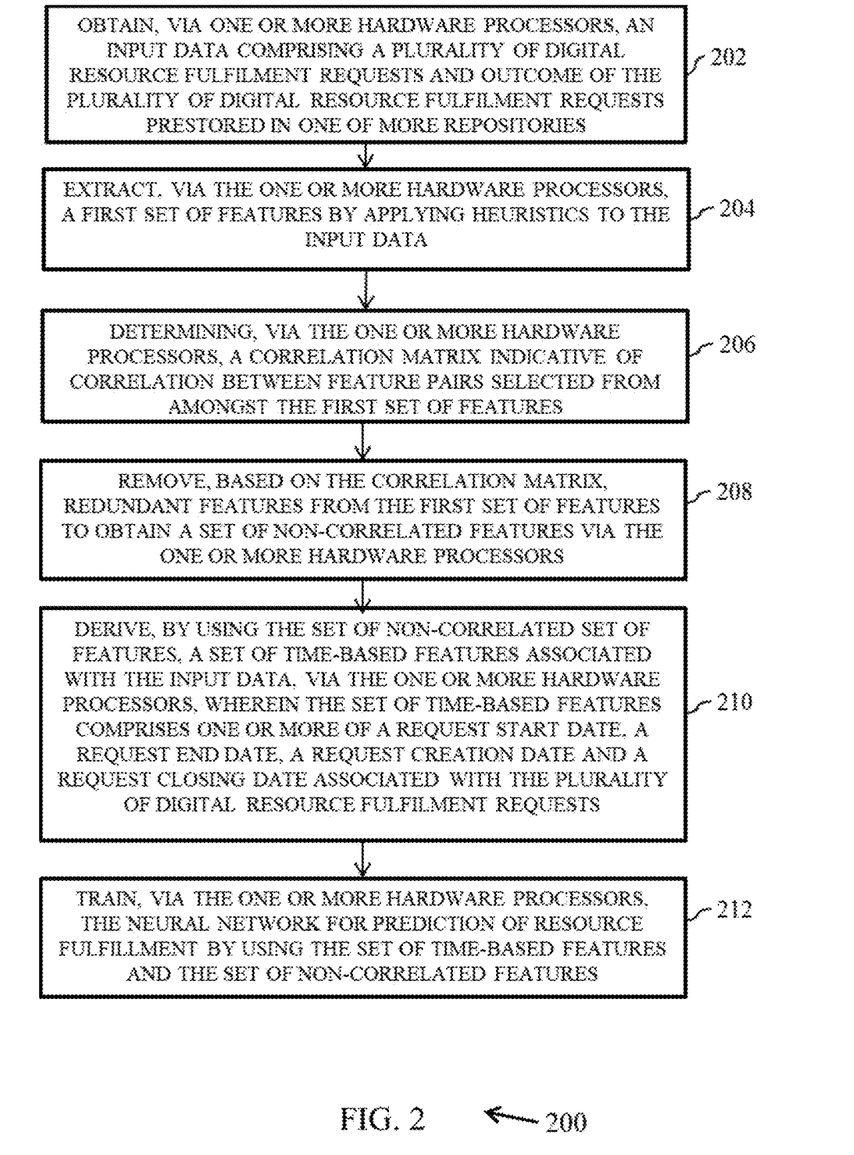
FIG. 2 is a flow chart illustrating a method for resource fulfilment prediction in accordance with some embodiments of the present disclosure.

FIG. 2 illustrates an example flow chart of a method 200 for label generation for resource fulfilment prediction, in accordance with an example embodiment of the present disclosure. The method 200 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

At 202, the method 200 includes obtaining an input data having a plurality of digital resource fulfilment requests and outcome of the plurality of digital resource fulfilment requests prestored in one of more repositories. The digital resource fulfilment requests may include historical resource fulfilment requests that may be prestored or sourced from external sources. In an embodiment, the input data may be prestored in the repository 112. For example, such data may be stored in one or more repositories associated with a firm or an enterprise. Additionally or alternatively, the input data may be obtained from external sources, for example, from external databases associated with recruitment agencies and so on.

The input data may be cleansed through methods like removing outliers, filling the missing data, and fixing the discrepancies in the data. Since machine learning requires values of the data in numerical form, hence all the non-numeric data in the dataset may be converted into numerical form. Data is standardized and scaled using, for example, min-max scaling method. Standardization of data ensures that non-uniform attributes of the dataset are in uniform form in the input data.

At 204, the method 200 includes extracting a first set of features from the input data, via one or more hardware processors. The first set of features may be extracted by applying heuristics to input data. The heuristics may be associated with determination of frequent usage of the available features. For example, the some of the features may be frequently used by the recruiters for the purpose of resource request fulfilment. Additionally or alternatively, the first set of features may be extracted from the available features of common and frequent usage of the available features, alongside expert knowledge and capability. The first set of features may include skills based features such as skills and respective skill proficiency, location related features (for example, the resource fulfilment location), time based features such as request generation features (including request generation date), request closure features (including request closure date), requesting authority or department, and so on.

At 206, the method 200 includes determining a correlation matrix indicative of correlation between feature pairs selected from amongst the first set of features. The correlation matrix facilitates in reducing redundancy in features by identifying unique features amongst the extracted features. The correlation matrix is determined by computing correlation coefficients for a plurality of feature pairs of from amongst the set of features. For instance, assuming that there are three features in a data, namely feature x, feature y, and feature z. Correlation coefficient between xy, xz, and yz may be calculated and arranged in the correlation matrix. It will be noted that the diagonal values in the correlation matric are '1', since the diagonal values represent correlation between, xx or yy or zz features. In an embodiment, the correlation between a feature pair from amongst the plurality of feature pair is computed based on the expression:

$$r_{xy} = \frac{\sum(x_i - \bar{x})(y_i - \bar{y})}{\sqrt{\sum(x_i - \bar{x})^2 \sum(y_i - \bar{y})^2}}$$

where xi represents values of the x-feature in a feature pair,
$\bar{x}$ represents mean of the values of the x-feature,
yi represents values of the y-variable in the feature pair, and
$\bar{y}$ represents mean of the values of the y-feature.

In an embodiment, the correlation matrix may be presented in form of a heat map of correlation coefficients such that high correlation coefficients are represented in dark colors and low with light colors.

The feature pairs which are determined to be highly correlated in the correlation matrix may be deduplicated to reduce collinearity. At 208, the method 200 includes removing redundant features from the first set of features based on the correlation matrix to obtain a set of non-correlated features. Herein, the redundant features may refer to highly correlated features. The correlation coefficients in the correlation matrix are indicative of the level of the correlation amongst the feature pairs. In an embodiment, the feature pairs having a correlation coefficient greater than a predefined threshold value may be considered as highly correlated or redundant features. Thus, one of the features from amongst the highly correlated feature pairs may be removed to obtain unique features and a set of such unique features may be referred to as a set of non-correlated features. For example, 'start date' of a resource fulfilment requirement and the 'location' are non-correlated, the 'client geography' and the 'location' where the resource fulfilment requirement must be placed are non-correlated features.

At 210, the method 200 includes deriving, by using the set of non-correlated features, a set of time-based features associated with the input data. For example, the time-based features may include, but are not limited to, difference in time between registering the request and the start date, difference in dates resource request start date, resource request end date, the date the resource request was created, the date when the resource request was closed, and so on associated with the plurality of digital resource fulfilment requests. The time-based features may be used to derive features from the differences in all the dates supplied including, for example, start date, end date, request closed date and so on. Further features may be derived into different units, based on log, power, week number, and so on. Based on the non-correlated time-based features, a set of time-based features. For example, based on the aforementioned non-correlated time-based features, the set of time-based features that may be derived may include, but are not limited to, advance notice time period, time elapsed with respect to resource request generation, and so on. Herein, the advance notice may refer to the time in advance of the start date when the talent request was raised. The advance notice may be calculated as a difference of the start date of resource request and resource request initiation date.

Advance Notice=Request Start Date−Resource request initiation date.

The elapsed time refers to how much time from the date the request was raised to the date the request was closed and is calculated as Resource request closure date minus resource request initiation date, as shown below:

Elapsed Time=Resource request closure date−Resource request initiation date

The feature, elapsed workdays, is computed in a similar manner as elapse time, only difference being that the elapsed workdays may be computed for workdays only, as shown below:

Elapsed Workdays=Resource request closure date−Resource request initiation date−Holidays−Weekends Using the set of non-correlated features and the set of derived features (i.e. the time-based features) and, the neural network can be trained for prediction of resource fulfillment at 212.

In an embodiment, the neural network may be a multi-layer neural network. An example implementation of a multi-layer neural network for the resource fulfilment prediction is provided further in the description.

The neural network is configured to receive a resource fulfilment request and predict resource fulfilment in response to the same. Herein, the prediction of the resource fulfilment includes obtaining a binary indicator or decision indicative of whether or not the resource requirement request would be fulfilled within a predefined time frame associated with the resource requirement request. The predefined time frame refers to a timeframe that may be allocated for fulfilling the resource fulfilment request. For instance, a resource fulfilment request may include a timeframe of four weeks from the date of generation of the resource fulfilment request. In such a scenario, the predefined timeframe may be four weeks or 20 workdays.

In response to a negation of the binary decision indicative that the resource fulfillment request remains unfulfilled within the predefined time frame, the disclosed system predicts a time frame for the resource fulfillment request. When processing the data, the system derives a number of target variables. In the present embodiment, the target variable is indicative of whether the requirement is fulfilled on time or not, i.e. closed date less than or equal to the start date. In case, the requirement closed date is greater than the requirement start date, the system converts the overdue number of days into weeks. For example, 1-7 days overdue is 1 week, 8-14 is 2 weeks, and so on, and from there the model is trained on the weeks overdue target variable.

In an embodiment, the prediction of the resource fulfilment includes predicting a final status of the resource requirement request for resource fulfilment. Herein, the final status is one of closing the resource fulfilment request irrespective of the predefined time frame or cancellation of the resource fulfilment request. In the present embodiment, the status of all previous resource fulfillment requests is provided with the input data for model training. Said status is used as a target variable while training the model.

Figure 3:
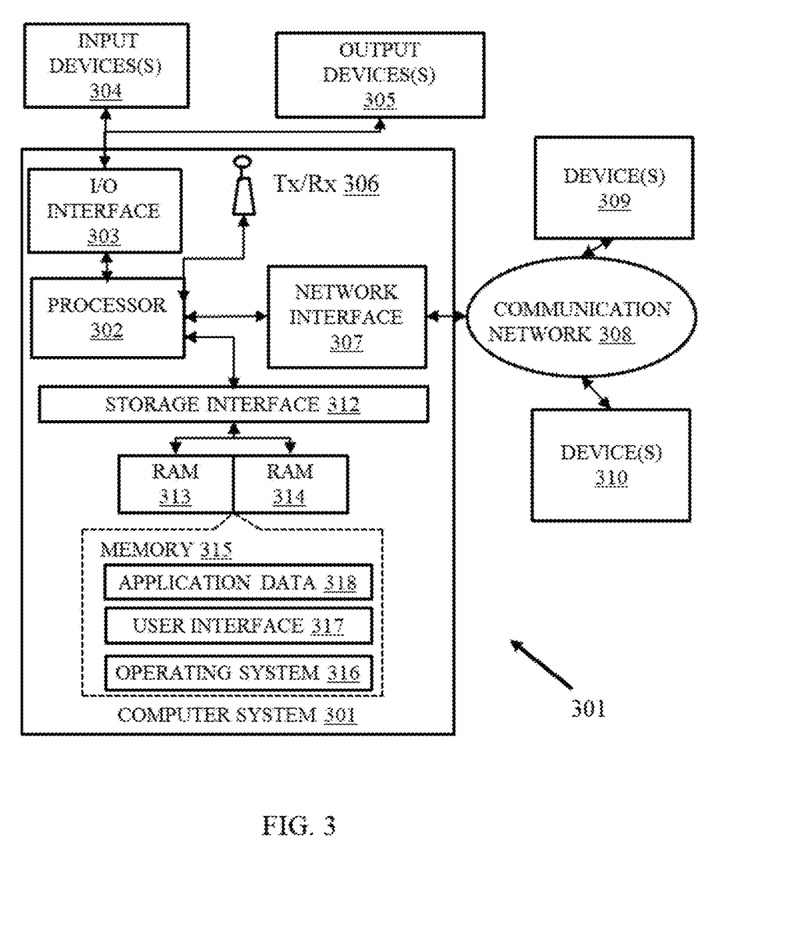
FIG. 3 is a block diagram of an exemplary computer system for implementing embodiments consistent with the present disclosure.

An example computer system implementing disclosed embodiments is described further with reference to FIG. 3.

FIG. 3 is a block diagram of an exemplary computer system 301 for implementing embodiments consistent with the present disclosure. The computer system 301 may be implemented in alone or in combination of components of the system 102 (FIG. 1). Variations of computer system 301 may be used for implementing the devices included in this disclosure. Computer system 301 may comprise a central processing unit ("CPU" or "hardware processor") 302. The hardware processor 302 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 302 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLnk WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 309 and 310. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 302 may be disposed in communication with one or more memory devices (e.g., RAM 613, ROM 614, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 316, user interface application 317, user/application data 318 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 301 may store user/application data 618, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

An example scenario depicting the prediction performance of the disclosed neural network for predicting resource fulfilment is described below.

Example Scenario

For the purpose of experimentation, a mufti-layer neural network was employed. The model was trained on the subset of the historic data selected randomly.

The historical data includes, for example, skills and experience, seniority level, customer or client demographics, location demographics, Service unit, start date, end date, and so on.

The input data is preprocessed by perform correlation analysis thereon to identify a set key features (referred to as first set of key features). Any correlated data/features is removed from the set of key features to obtain relevant data.

Thereafter, certain more features are derived from the relevant data/set of key features. The model was trained using 80% of the data set, and validated and trained using 20% of the data set.

Separate Neural Network was deployed for each of the resource fulfilment predictions including, (1) Model 1 to predict whether each of the converted resource request will be fulfilled on time, (2) Model 2 to predict by when each of the resource request will be fulfilled up to the predefined time frame (e.g. seven weeks) after the resource fulfilment requirement start date, (3) Model 3 to predict whether these requirements will be leverage (On time or not) or due to other problems they will be cancelled in some way.

For predicting timeliness of fulfillment, since the output variable can take only two possible values (request fulfilled on time or not), a binary Neural Network classifier was designed. This neural network consists of a multi-layer neural network as follows.

The learning rate was taken to be 0.001, batch size was 10, and number of epochs was 20. The training data size was 15313. The validation Set Size was 2245. The layers of the multi-layer neural network included the following:

Layer 1: 40 activation nodes; ReLU activation; dropout=0.5

Layer 2: 80 activation nodes; ReLU activation; dropout=0.5

Layer 3: 40 activation nodes; ReLU activation; dropout=0.5

Layer 4: 10 activation nodes; ReLU activation

Layer 5: 1 activation node; sigmoid activation

Along with the unique focus and outcome, the neural network has the unique properties of being a very light model and can be trained on low volumes of data and low-cost hardware. No special equipment or powerful GPUs were required, as such the training time for any new version of the model or updates can be very quick. This is further due in part to the neural network having very few layers and a small number of activation nodes per layer owing to reduction in the number of features required for accurate prediction of resource fulfilment.

For predicting the time to be taken for the fulfilment, multiclass (categorical output of 1 to 7 representing the number of weeks after the request requirement start date) Neural Network classifier was designed. This consists of a multi-layer neural network as follows:

Learning rate=0.001, Batch size=10, Number of epochs=50, Training data set size of 15313, and Validation Set Size=2245. The layers of the multi-layer neural network included the following:

Layer 1: 80 activation nodes; ReLU activation; dropout=0.2

Layer 2: 40 activation nodes; ReLU activation; dropout=0.2

Layer 3: 10 activation nodes; ReLU activation; dropout=0.2

Layer 4: 7 activation nodes; Softmax activation

Herein, addition of the dropout layer significantly reduced overfitting in the test model.

For predicting the status of the resource request which is again a multi-classification (categorical output of 1 to 3 representing the different reasons for request closure—cancelled, hard closed or closed). This neural network consists of a multi-layer neural network as follows:

Learning rate=0.0001, Batch size=10, Number of epochs=1000, Training data set size of 15313, Validation Set Size=2245. The layers of the multi-layer neural network included the following:

Layer 1: 800 activation nodes; leaky ReLU activation=0.3; batch normalization; dropout=0.4

Layer 2: 400 activation nodes; leaky ReLU activation=0.3; batch normalization; dropout=0.4

Layer 3: 200 activation nodes; leaky ReLU activation=0.3; batch normalization; dropout=0.4

Layer 4: 50 activation nodes; leaky ReLU activation=0.3; batch normalization; dropout=0.4

Layer 5: 20 activation nodes; leaky ReLU activation=0.3; batch normalization;

Layer 6: 3 activation nodes; softmax activation

Addition of dropout layer significantly reduced overfitting in the test model. Changing of activation function from ReLU to leaky ReLuU has improved the overall model performance.

Figure 4A:
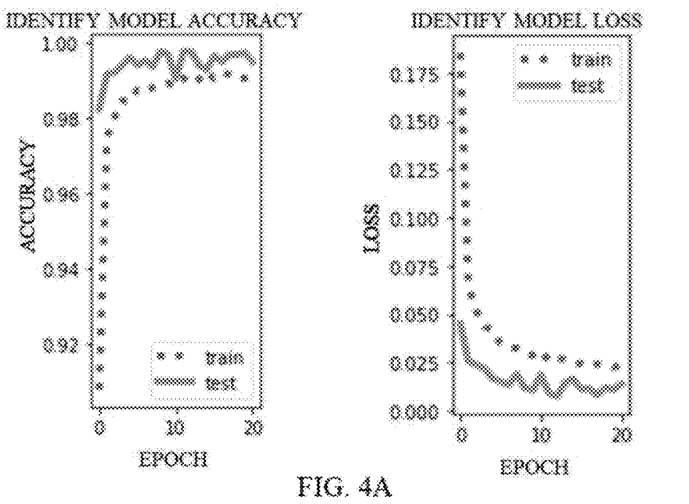
FIGS. 4A-4C are graphical representations illustrating accuracy of neural network (using only time-based features) for comparison of resource fulfilment prediction for different scenarios of the resource fulfilment prediction according to some embodiments of the present disclosure.
Figure 4B:
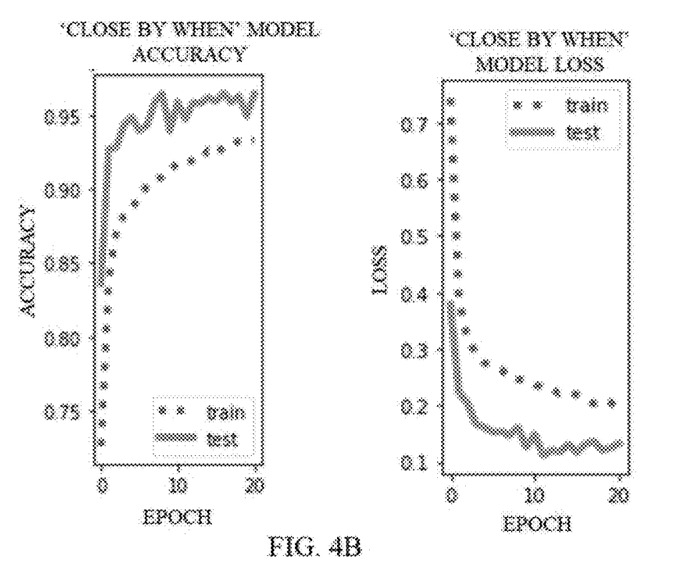
Figure 4C:
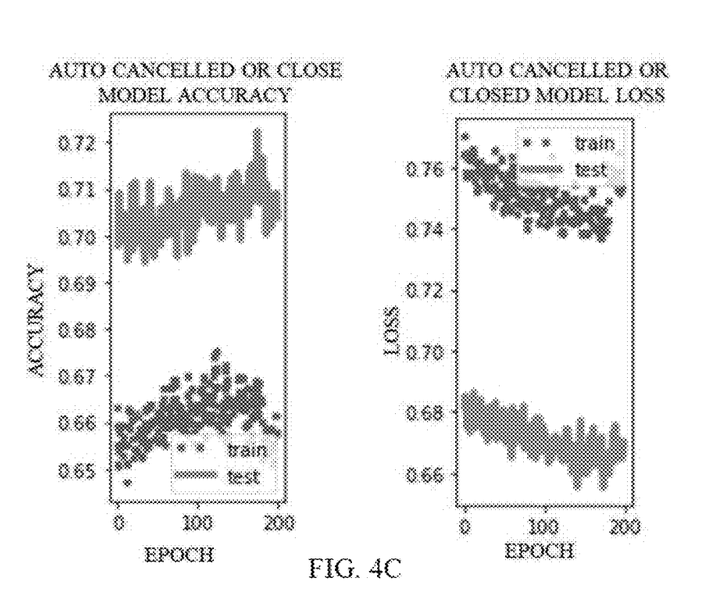

Post development of the model, the model was run on operational data from the RM team. Over a period of one month the operational accuracy was tracked. The model prediction accuracy of each of the three models while using different feature sets is shown with reference to FIGS. 4A-6C:

Referring to FIGS. 4A-4C, graphical representations illustrating accuracy of neural network (using only time-based features) for comparison of resource fulfilment prediction for different scenarios of the resource fulfilment prediction are provided in accordance with some embodiments of the present disclosure. In particular, FIGS. 4A-4C illustrates graphical representation of model accuracy for Model-1, Model-2 and Model-3 respectively. As is seen from the aforementioned variations, the accuracy of Model-1 is 99.92% and F-Score is 99.92%. For Model-2 and model-3, the accuracy is 97.07%, and 72.74%. The variation of accuracy in terms of precision, recall and F-score is presented in the table below:

TABLE 1A

Accuracy - Model-1

|  | Precision | Recall | F-score |
|---|---|---|---|
| Results | 0.9967 | 0.9975 | 0.9971 |

TABLE 1B

Accuracy - Model-2

|  | Precision | Recall | F-score |
|---|---|---|---|
| Accuracy |  |  | 0.97 |
| Macro average | 0.93 | 0.91 | 0.92 |
| Weighted average | 0.97 | 0.97 | 0.97 |

TABLE 1C

Accuracy Model-3

|  | Precision | Recall | F-score |
|---|---|---|---|
| Accuracy |  |  | 0.72 |
| Macro average | 0.73 | 0.74 | 0.73 |
| Weighted average | 0.72 | 0.72 | 0.72 |

Figure 5A:
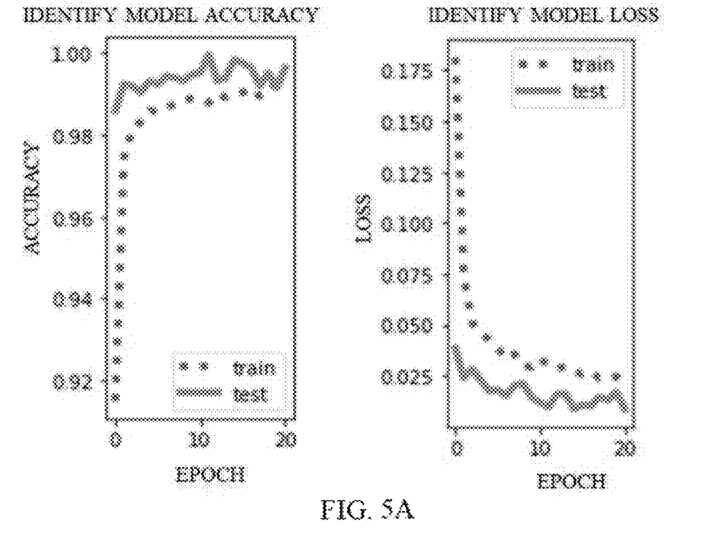
FIGS. 5A-5C are graphical representations illustrating accuracy of disclosed neural network (using time-based features and skill-based features) for comparison of resource fulfilment prediction for different scenarios of the resource fulfilment prediction.
Figure 5B:
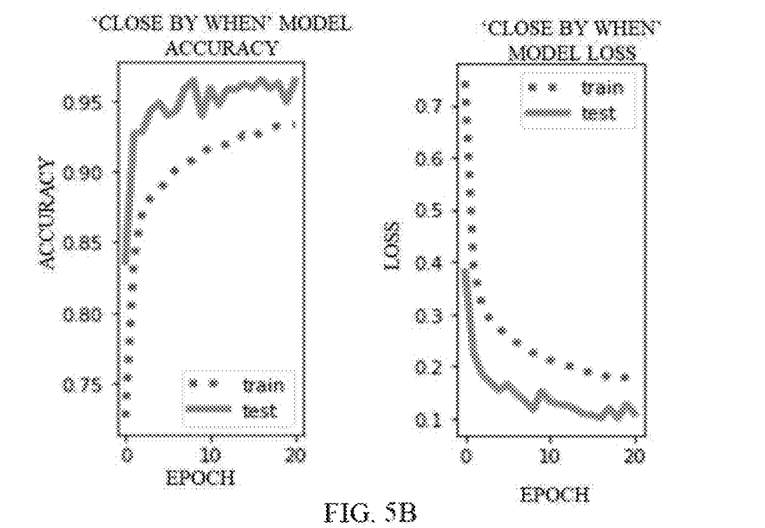
Figure 5C:
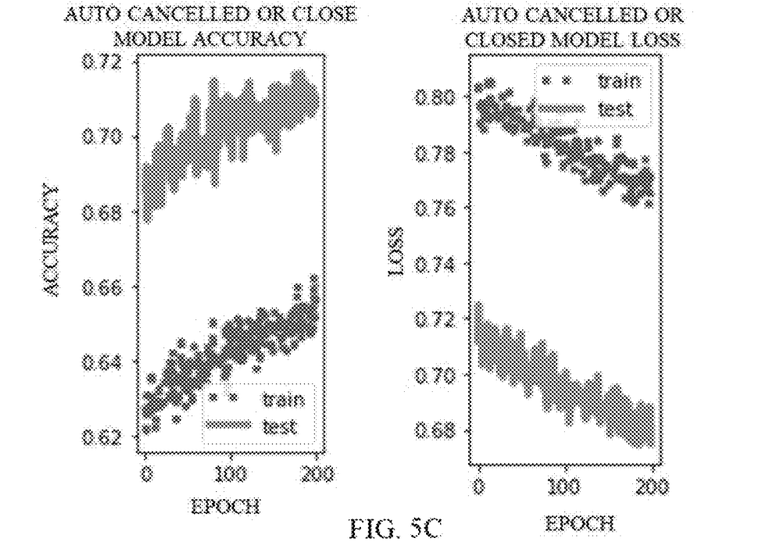

FIGS. 5A-5C are graphical representations illustrating accuracy of disclosed neural network (using time-based features and skill-based features) for comparison of resource fulfilment prediction for different scenarios of the resource fulfilment prediction. In particular, FIGS. 5A-5C illustrates graphical representation of model accuracy for Model-1, Model-2 and Model-3 respectively. As is seen from the aforementioned variations, the accuracy of Model-1 is 99.72% and F-Score is 99.71 For Model-2 and model-3, the accuracy is 96.5%, and 71.27%. The variation of accuracy in terms of precision, recall and F-score is presented in the table below:

TABLE 1D

Accuracy - Model-1

|  | Precision | Recall | F-score |
|---|---|---|---|
| Results | 0.9967 | 0.9975 | 0.9971 |

Table 1E

Accuracy - Model-2

|  | Precision | Recall | F-score |
|---|---|---|---|
| Accuracy |  |  | 0.965 |
| Macro average | 0.91 | 0.29 | 0.90 |
| Weighted average | 0.97 | 0.97 | 0.96 |

TABLE 1F

Accuracy Model-3

|  | Precision | Recall | F-score |
|---|---|---|---|
| Accuracy |  |  | 0.71 |
| Macro average | 0.71 | 0.73 | 0.72 |
| Weighted average | 0.71 | 0.71 | 0.71 |

Figure 6A:
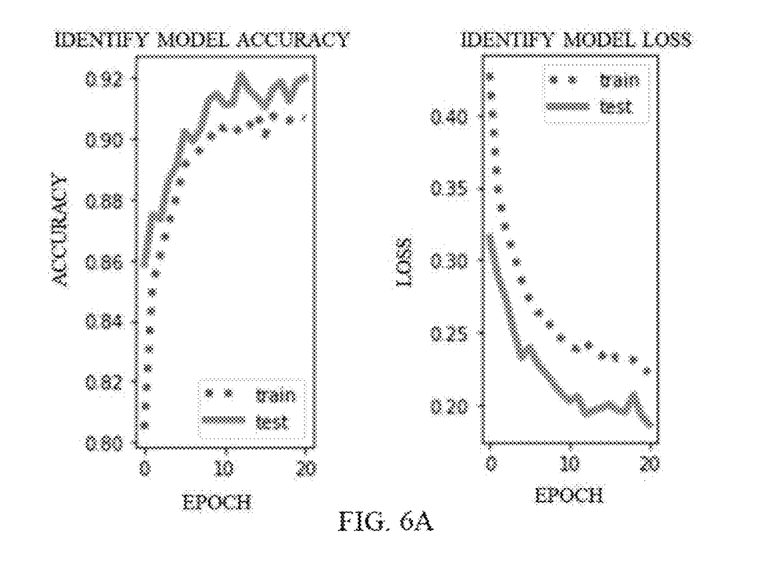
FIGS. 6A-6C are graphical representations illustrating accuracy of neural network (using only skill-based features) for comparison of resource fulfilment prediction for different scenarios of the resource fulfilment prediction.
Figure 6B:
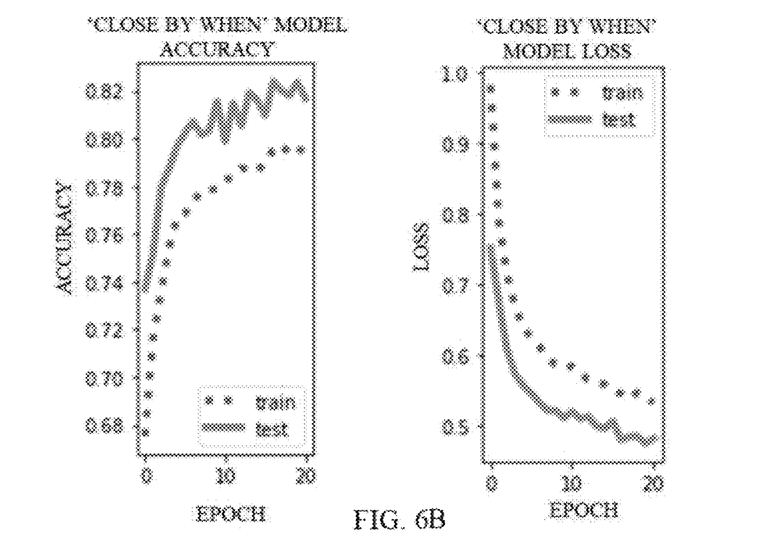
Figure 6C:
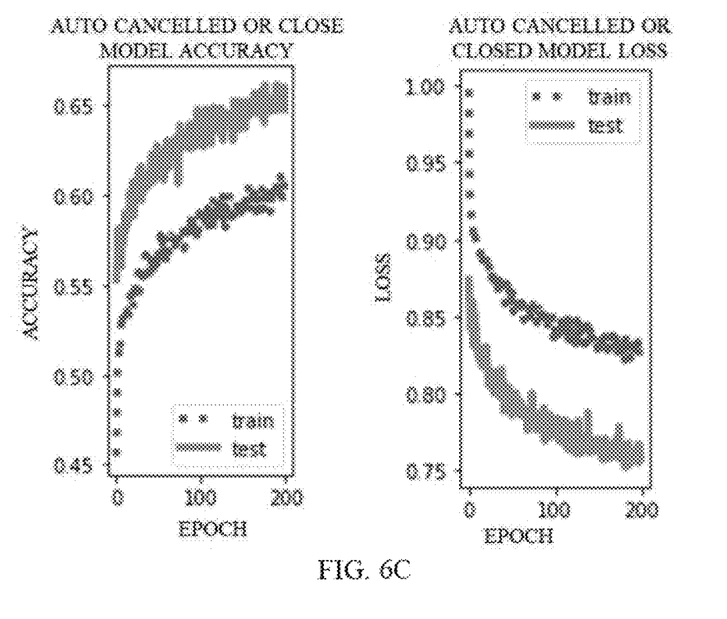

FIGS. 6A-6C are graphical representations illustrating accuracy of neural network (using only skill-based features) for comparison of resource fulfilment prediction for different scenarios of the resource fulfilment prediction. FIGS. 6A-6C illustrates graphical representation of model accuracy for Model-1, Model-2 and Model-3 respectively. As is seen from the aforementioned variations, the accuracy of Model-1 is 91.17% and F-Score is 91.91%. For Model-2 and model-3, the accuracy is 81.84%, and 67.22%. The variation of accuracy in terms of precision, recall and F-score is presented in the table below:

TABLE 1G

Accuracy - Model-1

|  | Precision | Recall | F-score |
|---|---|---|---|
| Results | 0.91 | 0.93 | 0.92 |

TABLE 1H

Accuracy - Model-2

|  | Precision | Recall | F-score |
|---|---|---|---|
| Accuracy |  |  | 0.82 |
| Macro average | 0.53 | 0.51 | 0.51 |
| Weighted Average | 0.79 | 0.82 | 0.80 |

TABLE 1I

Accuracy Model-3

|  | Precision | Recall | F-score |
|---|---|---|---|
| Accuracy |  |  | 0.67 |
| Macro average | 0.69 | 0.68 | 0.68 |
| Weighted average | 0.67 | 0.69 | 0.67 |

As is seen from the above experimental results, it can be concluded that the disclosed models provide accurate results with up to 99.9% accuracy for Model-1 and 97% accuracy for model-2 when only time based features are used for prediction. It is noted that the aforementioned results are indicative of a better model accuracy as compared to the mod& accuracy when (1) either both skill-based and time-based features are used, or (2) when only skill-based features are used for prediction.

Herein, it will be understood that the aforementioned implementations of the neural network are provided for the purpose of representation of results and accuracy achieved by the model. In various other implementations, the parameters of the NN may be modified and further improved accuracy levels may be achieved from the disclosed models.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent dements with insubstantial differences from the literal language of the claims.

Various embodiments disclosed herein provides method and system for neural network-based resource fulfilment prediction. In particular, the embodiments disclose a machine Learning based model to predict the staffing fulfilment success and timelines. This capability is specific for the teams who are tasked with the operations aspect of staff fulfillment. Typical systems known in art are primarily focused on matching resumes with job descriptions. However, the ability to prioritize or communicate the timeliness of resource availability is not addressed in the conventional systems.

The disclosed model is adapted to predict timeliness of resource availability/fulfilment by assuming three configurations, namely, (1) Model-1 to predict whether each of the converted resource request will be fulfilled on time, (2) Model-2 to predict by when each of the resource request will be fulfilled up to the predefined time frame (e.g. seven weeks) after the resource fulfilment requirement start date, (3) Model-3 to predict whether these requirements will be leverage (On time or not) or due to other problems they will be cancelled in some way.

The conventional systems typically rely on availability of the requisite skills in the resource requirement request. An important contribution of the present method and system is that the disclosed method and system utilizes only time-based features (as against the skill-based features utilized in the conventional staffing or resource fulfilment systems) for predicting resource request fulfilment or job positions. Due to extraction and utilization of the time-based features for resource fulfilment, the disclosed system is capable to accurately predict the chances of closure of the resource fulfilment on time.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   obtaining, via one or more hardware processors, an input data comprising a plurality of digital resource fulfilment requests and an outcome of the plurality of digital resource fulfilment requests prestored in one or more repositories;
   extracting, via the one or more hardware processors, a first set of features by applying heuristics to the input data, wherein the first set of features include skills and respective skill proficiency, a resource fulfilment location, a request creation date, a request closure date, and a requesting authority or department;
   determining, via the one or more hardware processors, a correlation matrix indicative of correlation between feature pairs selected from amongst the first set of features, wherein the feature pairs that are determined to be highly correlated in the correlation matrix are deduplicated to reduce collinearity;
   removing, based on the correlation matrix, redundant features from the first set of features to obtain a set of non-correlated features via the one or more hardware processors, wherein the set of non-correlated features are unique features correspond to a start date of the digital resource fulfilment request and the resource fulfilment location and, a client geography and the resource fulfilment location where the resource fulfilment request is placed;
   deriving, by using the set of non-correlated set of features, a set of time-based features associated with the input data, via the one or more hardware processors, wherein the set of time-based features comprises differences in time between one or more of a request start date, a request end date, the request creation date and the request closure date associated with the plurality of digital resource fulfilment requests, wherein the time-based features derive features from the differences in the dates supplied including the request start date, the request end date, the request closure date,
   wherein the set of time-based features further include an advance notice time period, a time elapsed with respect to resource request generation; and
   training, via the one or more hardware processors, a multi-layer neural network model for prediction of resource fulfillment by using the set of time-based features and the set of non-correlated features, wherein status of all previous resource fulfillment requests is provided with the input data for training the multi-layer neural network model and the status is considered as a target variable while training the multi-layer neural network model,
   wherein the trained multi-layer neural network model is implemented on operational data from a resource management team and accuracy is tracked for a predefined time period.

2. The processor implemented method of claim 1, further comprises predicting resource fulfillment in response to a resource fulfilment request, wherein predicting the resource fulfilment comprises:
- obtaining a binary decision indicative of whether or not the resource requirement request be fulfilled within a predefined time frame associated with the resource requirement request; and
- in response to negation of the binary decision indicative that the resource fulfillment request remains unfulfilled within the predefined time frame, predicting a time frame for the resource fulfillment request.

3. The processor implemented method as claimed in claim 2, wherein predicting the resource fulfilment further comprises predicting a final status of the resource requirement request for resource fulfilment, the final status being one of closing the resource irrespective of the predefined time frame and cancellation of the resource fulfilment request.

4. The processor implemented method of claim 1, wherein the correlation amongst features of the feature pair is computed based on the expression:

$$r_{xy} = \frac{\sum(x_i - \bar{x})(y_i - \bar{y})}{\sqrt{\sum(x_i - \bar{x})^2 \sum(y_i - \bar{y})^2}}$$

where xi represents values of the x-variable in a feature pair,
$\bar{x}$ represents mean of the values of the x-feature,
yi represents values of the y-variable in the feature pair, and
$\bar{y}$ represents mean of the values of the y-feature.

5. A system, comprising:
a memory storing instructions;
one or more communication interfaces; and
one or more hardware processors coupled to the memory via the one or more communication interfaces, wherein the one or more hardware processors are configured by the instructions to:
- obtain an input data comprising a plurality of digital resource fulfillment requests and outcome of the plurality of digital resource fulfillment requests prestored in one or more repositories;
- extract a first set of features from the input data by applying heuristics to the input data, wherein the first set of features include skills and respective skill proficiency, a resource fulfilment location, a request creation date, a request closure date, and a requesting authority or department;
- determine a correlation matrix indicative of correlation between feature pairs selected from amongst the first set of features, wherein the feature pairs that are determined to be highly correlated in the correlation matrix are deduplicated to reduce collinearity;
- remove, based on the correlation matrix, redundant features from the first set of features to obtain a set of non-correlated features, wherein the set of non-correlated features are unique features correspond to a start date of the digital resource fulfilment request and the resource fulfilment location and, a client geography and the resource fulfilment location where the resource fulfilment request is placed;
- derive, by using the set of non-correlated set of features, a set of time-based features associated with the input data, wherein the set of time-based features comprises differences in time between one or more of a request start date, a request end date, the request creation date and the request closure associated with the plurality of digital resource fulfilment requests, wherein the time-based features derive features from the differences in the dates supplied including the request start date, the request end date, the request closure date,
wherein the set of time-based features further include an advance notice time period, a time elapsed with respect to resource request generation; and
- train a multi-layer neural network model for prediction of resource fulfillment by using the set of time-based features and the set of non-correlated features, wherein status of all previous resource fulfillment requests is provided with the input data for training the multi-layer neural network model and the status is considered as a target variable while training the multi-layer neural network model,
wherein the trained multi-layer neural network model is implemented on operational data from a resource management team and accuracy is tracked for a predefined time period.

6. The system as claimed in claim 5, wherein the one or more hardware processors further configured by the instruction to predict resource fulfillment in response to a resource fulfilment request, wherein to predict the resource fulfilment, the one or more hardware processors further configured by the instruction to:
- obtain a binary decision indicative of whether or not the resource requirement request be fulfilled within a predefined time frame associated with the resource requirement request; and
- in response to negation of the binary decision indicative that the resource fulfillment request remains unfulfilled within the predefined time frame, predict a time frame for the resource fulfillment request.

7. The system as claimed in claim 5, wherein to predict the resource fulfilment, the one or more hardware processors further configured by the instruction to further predict a final status of the resource requirement request for resource fulfilment, the final status being one of closing the resource irrespective of the predefined time frame and cancellation of the resource fulfilment request.

8. The system as claimed in claim 5, wherein the correlation amongst features of the feature pair is computed based on the expression:

$$r_{xy} = \frac{\sum(x_i - \bar{x})(y_i - \bar{y})}{\sqrt{\sum(x_i - \bar{x})^2 \sum(y_i - \bar{y})^2}}$$

where xi represents values of the x-variable in a feature pair,
$\bar{x}$ represents mean of the values of the x-feature,
yi represents values of the y-variable in the feature pair, and
$\bar{y}$ represents mean of the values of the y-feature.

9. One or more non-transitory machine readable information storage mediums comprising one or more instructions which when executed by one or more hardware processors cause:
- obtaining, via one or more hardware processors, an input data comprising a plurality of digital resource fulfilment requests and an outcome of the plurality of digital resource fulfilment requests prestored in one or more repositories;

extracting, via the one or more hardware processors, a first set of features by applying heuristics to the input data, wherein the first set of features include skills and respective skill proficiency, a resource fulfilment location, a request creation date, a request closure date, and a requesting authority or department;

determining, via the one or more hardware processors, a correlation matrix indicative of correlation between feature pairs selected from amongst the first set of features, wherein the feature pairs that are determined to be highly correlated in the correlation matrix are deduplicated to reduce collinearity;

removing, based on the correlation matrix, redundant features from the first set of features to obtain a set of non-correlated features via the one or more hardware processors, wherein the set of non-correlated features are unique features correspond to a start date of the digital resource fulfilment request and the resource fulfilment location and, a client geography and the resource fulfilment location where the resource fulfilment request is placed;

deriving, by using the set of non-correlated set of features, a set of time-based features associated with the input data, via the one or more hardware processors, wherein the set of time-based features comprises differences in time between one or more of a request start date, a request end date, the request creation date and the request closure date associated with the plurality of digital resource fulfilment requests, wherein the time-based features derive features from the differences in the dates supplied including the request start date, the request end date, the request closure date, wherein the set of time-based features further include an advance notice time period, a time elapsed with respect to resource request generation; and training, via the one or more hardware processors, a multi-layer neural network model for prediction of resource fulfillment by using the set of time-based features and the set of non-correlated features, wherein status of all previous resource fulfillment requests is provided with the input data for training the multi-layer neural network model and the status is considered as a target variable while training the multi-layer neural network model, wherein the trained multi-layer neural network model is implemented on operational data from a resource management team and accuracy is tracked for a predefined time period.

\* \* \* \* \*